(12) United States Patent
Ishii

(10) Patent No.: US 9,996,770 B2
(45) Date of Patent: Jun. 12, 2018

(54) IMAGE PROCESSING METHOD, IMAGE PROCESSING APPARATUS, RECORDING MEDIUM, AND METHOD OF MANUFACTURING ASSEMBLY

(71) Applicant: CANON KABUSHIKI KAISHA, Tokyo (JP)

(72) Inventor: Masaki Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/219,805

(22) Filed: Jul. 26, 2016

(65) Prior Publication Data

US 2017/0032513 A1 Feb. 2, 2017

(30) Foreign Application Priority Data

Jul. 29, 2015 (JP) .................................. 2015-149328

(51) Int. Cl.
  *G06K 9/62* (2006.01)
  *G06T 7/00* (2017.01)
  *G06K 9/46* (2006.01)
  *G06T 7/70* (2017.01)

(52) U.S. Cl.
  CPC ......... *G06K 9/6202* (2013.01); *G06K 9/4604* (2013.01); *G06T 7/001* (2013.01); *G06T 7/70* (2017.01); *G06T 2207/30164* (2013.01)

(58) Field of Classification Search
  CPC ...... G06K 9/6202; G06K 9/4604; G06T 7/70; G06T 7/001; G06T 2207/30164
  USPC ........................................................ 382/103
  See application file for complete search history.

(56) References Cited

U.S. PATENT DOCUMENTS

2014/0205152 A1* 7/2014 Fujiki ....................... G06T 7/75
                                                  382/106

FOREIGN PATENT DOCUMENTS

JP          2002-140713 A          5/2002

* cited by examiner

*Primary Examiner* — Amandeep Saini
(74) *Attorney, Agent, or Firm* — Canon USA, Inc. I.P. Division

(57) ABSTRACT

A model containing a plurality of model edges is acquired, and a position that matches the model is searched for within a search image. Within the search image, a plurality of edge extraction regions including the respective plurality of model edges when the model is moved to the position searched for are set, and an arithmetic operation of extracting an edge in each of the plurality of edge extraction regions is performed. If there is an edge extraction region where no edge has been able to be extracted, of the model moved to the position searched for, a model edge located in the edge extraction region where no edge has been able to be extracted is incorporated into an edge set, and fitting is performed to the edge set.

10 Claims, 10 Drawing Sheets

IMAGE PROCESSING METHOD, IMAGE PROCESSING APPARATUS, RECORDING MEDIUM, AND METHOD OF MANUFACTURING ASSEMBLY

BACKGROUND OF THE INVENTION

Field of the Invention

The present invention relates to an image processing method of measuring a position of a workpiece from a search image, an image processing apparatus, a recording medium, and a method of manufacturing an assembly.

Description of the Related Art

An operation of finding a workpiece from within a search image obtained by capturing an image of the workpiece is one of functions commonly used in machine vision. Typical image processing for searching for a pattern from within an image in this way is template matching. In template matching, a feature of a pattern that a user wants to search for is prepared as a model in advance. Then, in the case where the pattern is searched for from within a search image obtained by capturing an image of a workpiece, a feature extracted from the search image is checked against a feature of the model prepared in advance. In many cases, as a feature, an edge which is information of the contour of a workpiece is used. Here, "edge" refers to a set of pixels in which there is an abrupt change in shade on an image, that is, a set of pixels in which an absolute value of an intensity gradient is not less than a certain threshold value.

Template matching is a method of searching for a position (including an orientation) on a search image, and the position is highly correlated with a model prepared in advance. Thus, in some cases, an edge which is noise exists in the vicinity of an edge, or part of an edge is missing or uneven. In such cases, a correlation value with the model does not reach a maximum value at a correct position on the search image, and the accuracy of position and orientation measurements may decrease.

As a method that solves such an issue, there is a method in which, in the case where a workpiece is circular or elliptical in shape, a position of the workpiece is measured with higher accuracy by performing circle fitting or ellipse fitting after searching for a temporary position of the workpiece through template matching or the like. Japanese Patent Laid-Open No. 2002-140713 discloses a method in which, in the case where a workpiece is circular in shape, a position of the workpiece is measured by setting a temporary center on a target image and performing fitting of a circle to an edge extracted from the target image.

In some cases, if an edge corresponding to an external shape of a workpiece cannot be used, a plurality of edges corresponding to a plurality of features other than the external shape of the workpiece are used. In such cases, fitting, such as circle fitting or ellipse fitting, is performed to center points of the respective edges.

In some cases, however, a shadow or the like appears in a captured image and hides features, and thus edge extraction fails, resulting in a reduction in the number of extracted edges. In the case where the number of edges usable as features of a workpiece is originally small, a reduction in the number of extracted edges reduces the accuracy of fitting, or makes fitting calculation impossible in some cases.

SUMMARY OF THE INVENTION

The present invention has been accomplished to measure a position of a workpiece with high accuracy even if the number of edges extracted from a search image is reduced.

An aspect of the present invention provides an image processing method in which a processing unit determines, through image processing, a position of a workpiece from a search image obtained by capturing an image of the workpiece. The image processing method includes: a model acquisition step of, with the processing unit, acquiring a model containing a plurality of model edges; a rough search step of, with the processing unit, within the search image, searching for a position that matches the model; an edge extraction step of, with the processing unit, within the search image, setting a plurality of edge extraction regions including the respective plurality of model edges when the model is moved to the position searched for in the rough search step and performing an arithmetic operation of extracting an edge in each of the plurality of edge extraction regions; and a close search step of, with the processing unit, performing fitting of a certain shape to an edge set of edges extracted in the edge extraction step to measure a position of the workpiece. In the close search step, if there is an edge extraction region where no edge has been able to be extracted in the edge extraction step, the processing unit incorporates, of the model moved to the position searched for in the rough search step, a model edge located in the edge extraction region where no edge has been able to be extracted in the edge extraction step into the edge set and performs the fitting.

According to the present invention, even if the number of edges extracted from the search image is reduced, the position of the workpiece can be measured with high accuracy.

Further features of the present invention will become apparent from the following description of exemplary embodiments with reference to the attached drawings.

DESCRIPTION OF THE EMBODIMENTS

Embodiments for implementing the present invention will be described in detail below with reference to the drawings.

First Embodiment

Figure 1A:
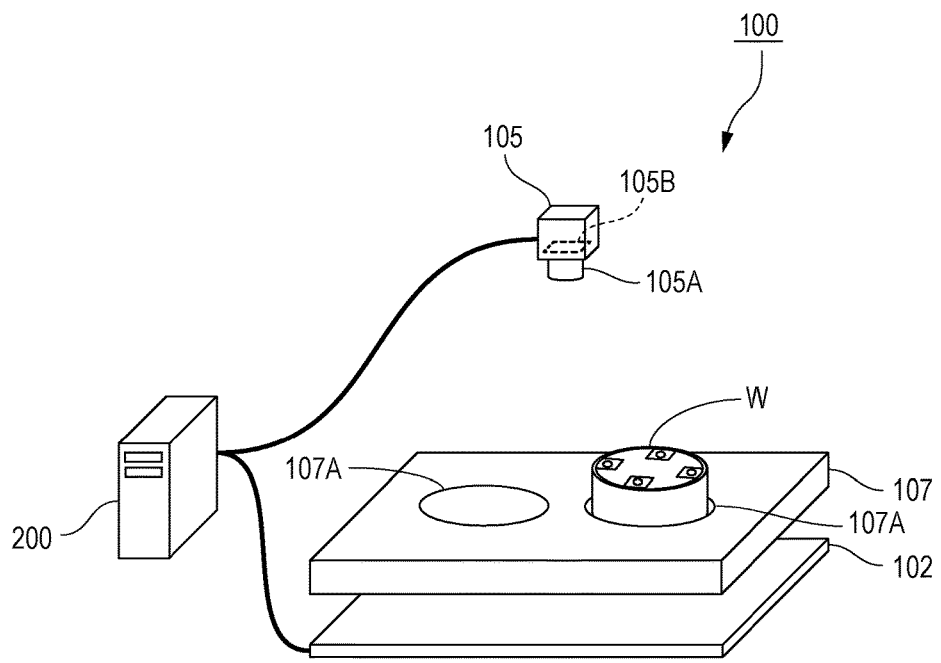
FIG. 1A illustrates an image processing system including an image processing apparatus according to a first embodiment.
Figure 1B:
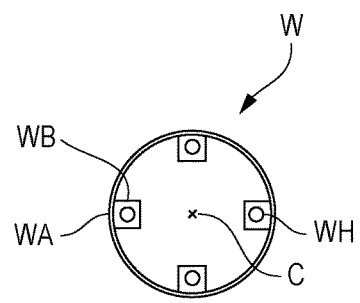
FIG. 1B is a plan view illustrating a workpiece, which is an object to be detected.

FIG. 1A illustrates an image processing system including an image processing apparatus according to a first embodiment of the present invention. FIG. 1B is a plan view illustrating a workpiece, which is an object to be detected.

As illustrated in FIG. 1A, an image processing system 100 includes a light source 102, a camera 105, which is an image capturing device, and an image processing apparatus 200. The light source 102 and the camera 105 are connected to the image processing apparatus 200. A workpiece W, which is an object to be detected (object), is held by a tray 107. The tray 107 holding the workpiece W is disposed between the camera 105 and the light source 102.

As illustrated in FIG. 1B, the workpiece W has a cylindrical portion WA that is cylindrical in shape, and four projection portions WBs sticking out inside the cylindrical portion WA. Each projection portion WB has a through hole WH. Through holes WHs are arranged on the circumference of the same circle.

The tray 107 has two hollow portions 107A on which the workpiece W is to be installed, and only the hollow portions 107A are each made of a material through which light passes. Thus, only light passing through the hollow portions 107A of the tray 107 reaches the camera 105.

The light source 102 is a backlight device that applies light to (illuminates) the workpiece W. The light source 102 may be any light source, such as a light-emitting diode (LED) or halogen lamp, that applies the necessary amount of light for image processing to the workpiece W.

The camera 105 is a digital camera that receives light from the workpiece W to generate data of a captured image. The camera 105 has an image capturing lens 105A and an image sensing element (solid-state image sensing element) 105B.

The image sensing element 105B is an area sensor, such as a complementary metal oxide semiconductor (CMOS) image sensor or charge coupled device (CCD) image sensor. The image capturing lens 105A is an objective lens unit for adjusting a scaling factor and is adjusted so that the image sensing element 105B captures an image of the entire workpiece W.

The image processing apparatus 200 performs image processing on an captured image obtained by causing the camera 105 to capture an image of the workpiece W and determines a position (including an orientation) of the workpiece W.

Figure 2:
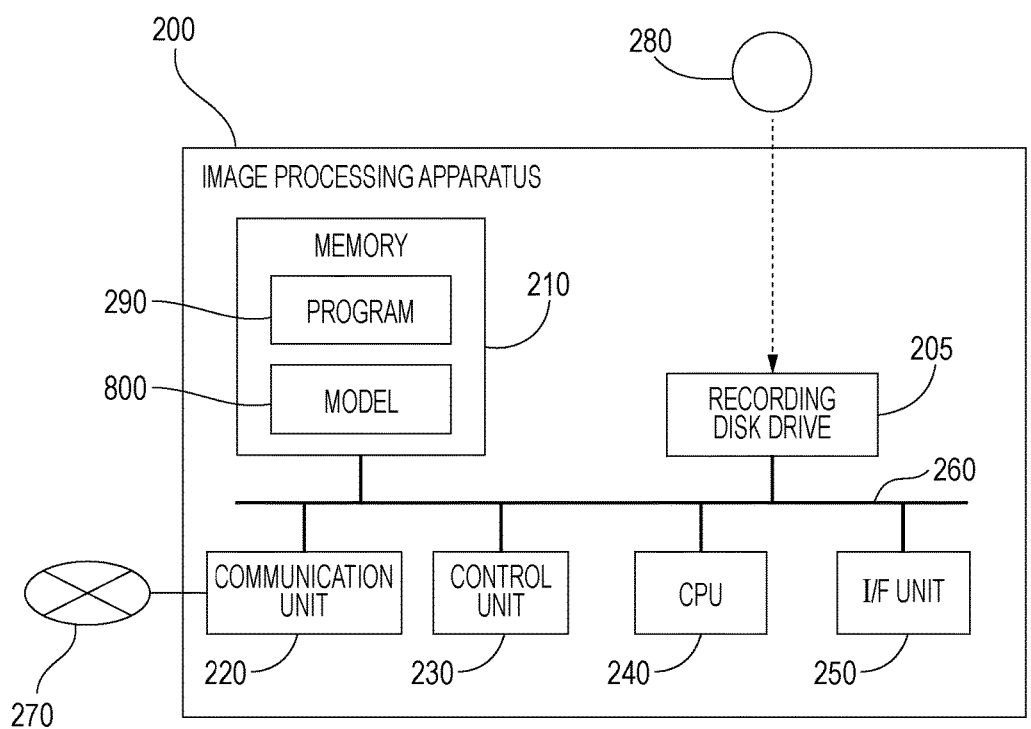
FIG. 2 is a block diagram illustrating the image processing apparatus according to the first embodiment.

FIG. 2 is a block diagram illustrating the image processing apparatus according to the first embodiment of the present invention. The image processing apparatus 200 includes a central processing unit (CPU) 240 serving as a processing unit (arithmetic unit). The image processing apparatus 200 also includes a memory 210 serving as a storage unit. The memory 210 is constituted by a read only memory (ROM), a random access memory (RAM), or a hard disk drive (HDD), for example. The image processing apparatus 200 further includes a recording disk drive 205, an interface (I/F) unit 250, a communication unit 220, a control unit 230, and a bus 260. The CPU 240, the memory 210, the recording disk drive 205, the I/F unit 250, the communication unit 220, and the control unit 230 are connected to the bus 260.

The recording disk drive 205 can read various pieces of data, a program, or the like recorded on a recording disk 280.

The memory 210 is a storage device that stores an arithmetic processing result provided by the CPU 240, pieces of acquired data (data of an image and data of a model 800), and the like. The memory 210 also records a program 290 for causing the CPU 240 to execute various arithmetic processing operations. The CPU 240 executes steps (operations) of an image processing method on the basis of the program 290 recorded (stored) on the memory 210. That is, the program 290 for executing the image processing method according to the first embodiment is loaded into the memory 210 and executed by the CPU 240.

The I/F unit 250 exchanges signals with various devices, such as the camera 105, the light source 102, and a display, which is not illustrated. The communication unit 220 communicates data, such as an image, through a network 270. The control unit 230 controls the entire image processing apparatus 200.

In the first embodiment, although the case where a computer-readable recording medium on which the program 290 is stored is the memory 210 or the recording disk 280 will be described, it is not limited to this. The program 290 may be recorded on any recording medium that is a computer-readable recording medium. As an example of a recording medium for supplying the program 290, an external storage device, which is not illustrated, or the like may be used. Specifically, examples of a recording medium that can be used include a flexible disk, a hard disk, an optical disc, a magnetic optical disk, a compact disc-ROM (CD-ROM), a compact disc-recordable (CD-R), a magnetic tape, a non-volatile memory, such as a Universal Serial Bus (USB) memory, and a ROM. The program 290 may also be supplied to the image processing apparatus 200 through the network 270.

The CPU 240 of the image processing apparatus 200 controls the camera 105 and the light source 102 and causes the camera 105 to capture an image of the workpiece W to obtain an image (search image). In the first embodiment, an example of the case where the CPU 240 measures a position of the workpiece W installed on the tray 107 will be described.

In measuring a position of the workpiece W, a technique, such as template matching, is often employed by using a shape feature of the workpiece W. In some shapes of workpieces Ws, however, the quantity of features usable for position measurement is often small. Even in such a case, a position has to be measured with high accuracy and stability. Although it is conceivable to typically use an edge of the contour of the workpiece W, the edge of the contour of the workpiece W cannot be used in some cases because, for example, the workpiece W may be complex in shape or the background of the workpiece W may have an influence on the edge in image capturing. In such a case, a small number of edge features of the surface of the workpiece W have to be used. In the first embodiment, position measurement performed in the case where the number of edge features usable is small as just described above will be described.

Specifically, in the case where only four through holes WHs are usable as features of the workpiece W, an example will be described where a position of the workpiece W is measured by calculating the center of a circle with a circumference passing through the four through holes WHs, that is, a center C of a circular plane.

Figure 3:
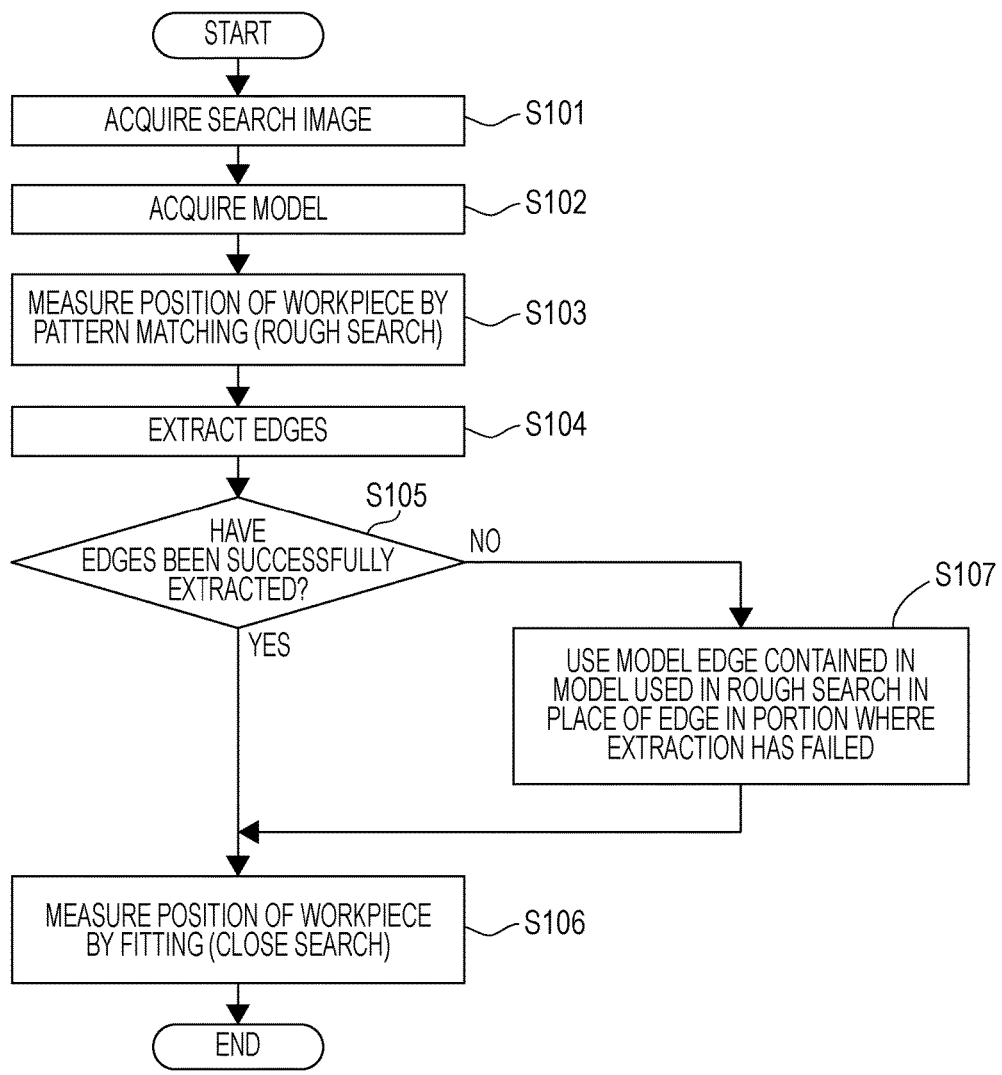
FIG. 3 is a flowchart illustrating an image processing method according to the first embodiment.

FIG. 3 is a flowchart illustrating the image processing method according to the first embodiment of the present invention. In the first embodiment, the CPU 240 executes each step (each operation) of the image processing method illustrated in FIG. 3 in accordance with the program 290.

Figure 4:
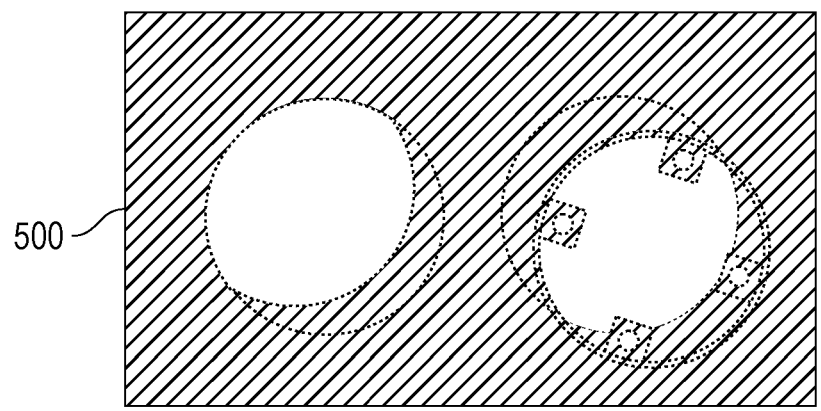
FIG. 4 is a schematic diagram illustrating a search image.

FIG. 4 is a schematic diagram illustrating a search image. The CPU 240 causes the camera 105 to capture an image of the workpiece W and acquires a search image 500 illustrated in FIG. 4 from the camera 105 (S101: image acquisition step, image acquisition operation). The CPU 240 not only acquires the search image 500 from the camera 105 but also may receive a search image 500 captured by another device through the network 270.

Subsequently, the CPU 240 acquires the model 800 recorded in advance on the memory 210 from the memory 210 (S102: model acquisition step, model acquisition operation).

Figure 5A:
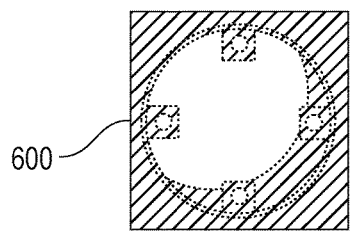
FIG. 5A is a schematic diagram illustrating an image for model generation.

Here, a method of generating the model 800 will be described. FIG. 5A is a schematic diagram illustrating an image for model generation. An image for model generation is also referred to as a model generation image. A model generation image 600 is an image of the workpiece W captured under ideal conditions.

Figure 5B:
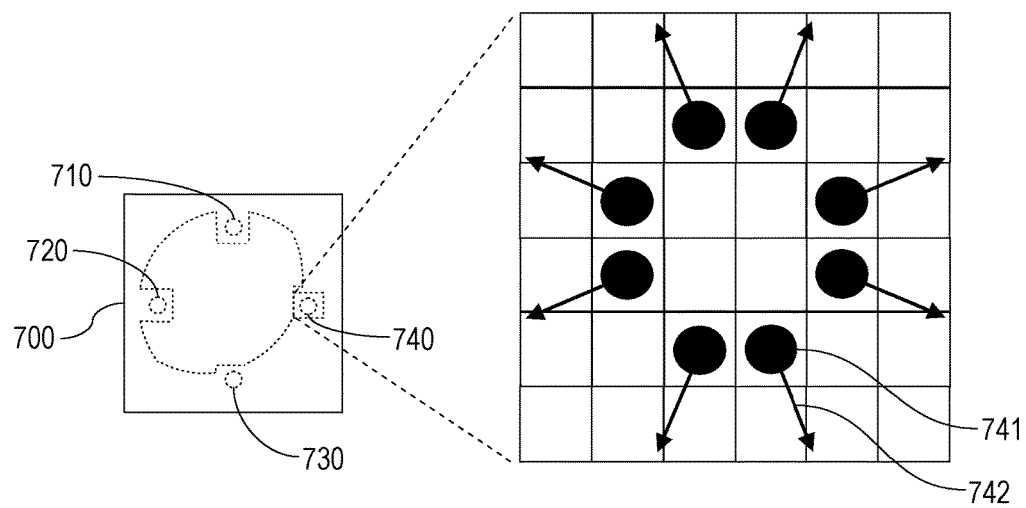
FIG. 5B is a schematic diagram illustrating an edge set extracted from a model generation image.

FIG. 5B is a schematic diagram illustrating an edge set extracted from a model generation image. In generating the model 800, the CPU 240 extracts an edge set 700 containing a plurality of edges 710, 720, 730, and 740 by applying an edge extraction filter, such as a Sobel filter or Canny filter, to the model generation image 600. In FIG. 5B, the edge 740 is constituted by a plurality of edge points 741, which are pixels existing. Each edge point 741 has information of an edge direction (the direction of an arrow 742) and an edge intensity (the length of the arrow 742).

Figure 5C:
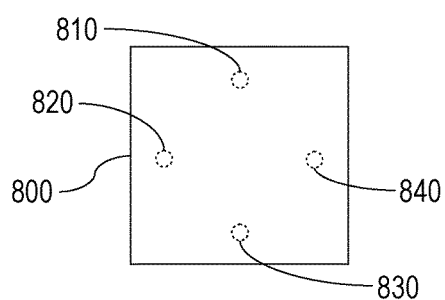
FIG. 5C is a schematic diagram illustrating a model.

FIG. 5C is a schematic diagram illustrating the model 800. The CPU 240 selects edges to be registered in the model 800 from the edge set 700 and causes them to serve as model edges 810, 820, 830, and 840. The model edges 810, 820, 830, and 840 contained in the model 800 correspond to the respective through holes WHs of the workpiece W. The model (model edge set) 800 generated in this way is stored on the memory 210.

In step S102, the CPU 240 reads the model 800 stored in advance on the memory 210.

Then, the CPU 240 performs a rough search by using the model 800 registered in advance to measure a position (temporary position) of the workpiece W (S103: rough search step, rough search operation). That is, within the search image 500 (specifically, within an edge set extracted from the search image 500), the CPU 240 searches for a position that matches the model 800 by pattern matching in step S103. Here, in the first embodiment, since the number of model edges contained in the model 800 is small, the accuracy of the determined position is low.

Figure 6A:
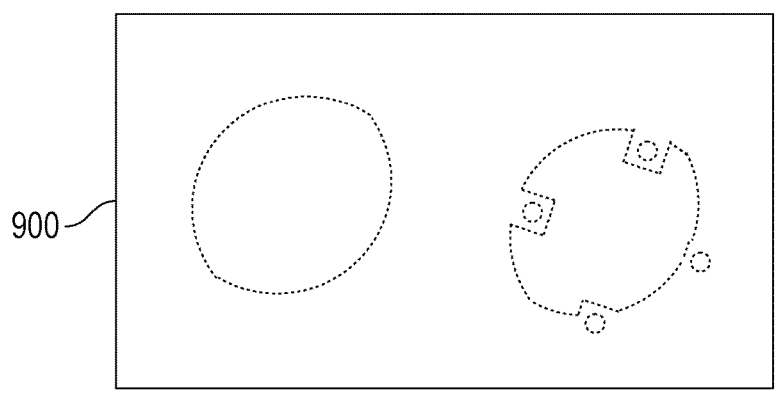
FIG. 6A is a schematic diagram illustrating an edge set extracted from the search image.

A rough search step will be described in detail below. FIG. 6A is a schematic diagram illustrating an edge set extracted from the search image. The CPU 240 extracts an edge set (search edge set) 900 constituted by a plurality of edges (search edges) by applying an edge extraction filter, such as a Sobel filter or Canny filter, to the search image 500.

Figure 6B:
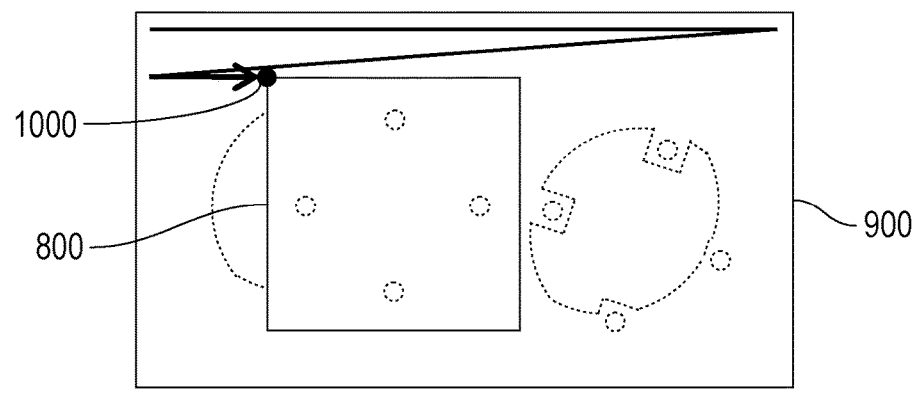
FIG. 6B is a schematic diagram illustrating an example where raster scanning is performed by moving the model on the search edge set.

FIG. 6B is a schematic diagram illustrating an example where, assuming an upper left corner pixel of the model (model edge set) 800 is a reference point 1000, raster scanning is performed by moving the reference point 1000 from the upper left corner of the search edge set 900.

The CPU 240 searches for a candidate point of a position of the workpiece W by using the model edge set 800 and the search edge set 900. Specifically, the CPU 240 searches for a candidate point by calculating the degree of matching (degree of similarity) while subjecting the model edge set 800 to translation/rotation from the upper left corner of the search edge set 900 with raster scanning.

A position (including an orientation) of the reference point 1000 at which the degree of matching between two edge sets 800 and 900 is not less than a predetermined threshold value is a candidate point. There is not always one candidate point and may be a plurality of candidate points.

Here, within the search image 500, a position that matches the model 800 is a position at which the degree of matching (degree of similarity) is not less than the threshold value. If there are a plurality of positions at which the degree of matching is not less than the threshold value, the position is one of the plurality of positions, desirably a position at which the degree of matching is a maximum degree.

The degree of matching between the two edge sets 800 and 900 is calculated by using edge directions as in Expression (1).

$$\frac{1}{N_T}\sum_{n=1}^{N_L} |\cos(I_{Ln} - T_{Ln})| \qquad (1)$$

In Expression (1), $N_L$ is the number of edge points in the model edge set 800, $T_{Ln}$ is an edge direction of the nth edge point in the model edge set 800, and $I_{Ln}$ is an edge direction of an edge point of a search edge at a position corresponding to $T_{Ln}$. Expression (1) calculates a difference in the edge direction between the model edge set 800 and the search edge set 900. If two edge sets match each other exactly, the degree of matching (degree of similarity) is 1, and if they do not match each other, the degree of matching (degree of similarity) is 0. Then, a position at which the degree of matching (degree of similarity) is not less than the threshold value is extracted as a candidate point. This position is a temporary position as a rough search result.

Subsequently, the CPU 240 performs an arithmetic operation of extracting edges corresponding to the through holes WHs from the search image 500 (S104: edge extraction step, edge extraction operation). That is, rough positions of the through holes WHs on the search image 500 can be found on the basis of the temporary position calculated in step S103. To extract edges of the through holes WHs on the search image 500, edge extraction regions specifying areas where the respective edges are extracted are set in the rough positions.

Figure 7A:
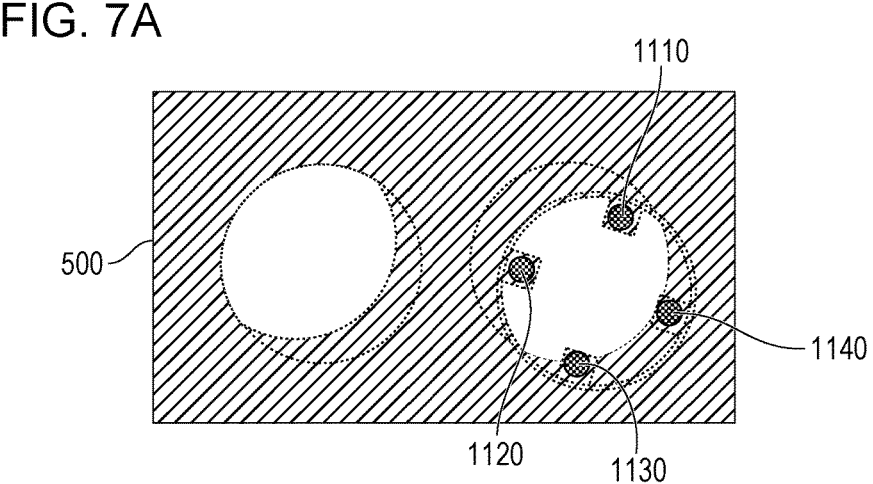
FIG. 7A is a schematic diagram illustrating a state in which edge extraction regions are set in the search image.

FIG. 7A is a schematic diagram illustrating a state in which edge extraction regions are set in the search image. In step S104, within the search image 500, the CPU 240 sets a plurality of edge extraction regions 1110 to 1140 respectively including the plurality of model edges 810 to 840 when the model 800 is moved to the position searched for in step S103. The CPU 240 performs an arithmetic operation of extracting edges in the respective edge extraction regions 1110 to 1140.

Then, the CPU 240 performs fitting of a certain shape, that is, fitting of a circle in the first embodiment to an edge set of the edges extracted in step S104 to measure a position of the workpiece W (S105 to S107: close search step, close search operation).

A close search operation will be specifically described below. First, the CPU 240 determines whether edges have been able to be extracted from all the edge extraction regions 1110 to 1140, that is, whether edges have been successfully extracted in all the edge extraction regions 1110 to 1140 (S105). In the first embodiment, it is determined whether all edges corresponding to the four through holes WHs have been able to be extracted. Specifically, the CPU 240 counts the number of edge points at which an absolute value of an intensity gradient is not less than a certain threshold value by applying an edge extraction filter in each of the edge extraction regions 1110 to 1140. If the number is not less than a certain threshold value, it is determined that an edge has been able to be extracted. Then, if edges have been able to be extracted in all the edge extraction regions 1110 to 1140, the CPU 240 proceeds to an operation of step S106, and if there is an edge that has not been able to be extracted, the CPU 240 proceeds to an operation of step S107.

Figure 7B:
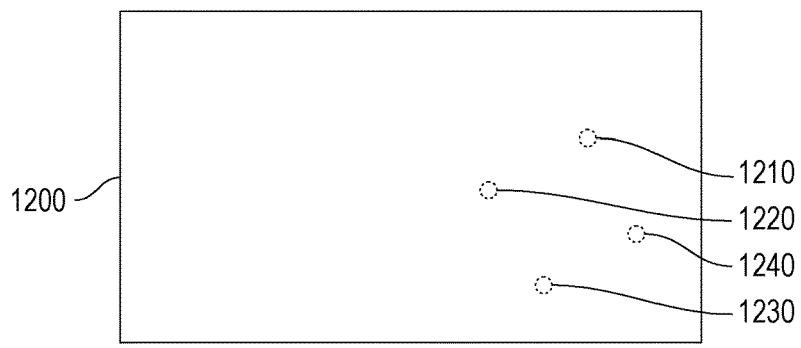
FIG. 7B is a schematic diagram illustrating the case where edges have been extracted from all the edge extraction regions.

FIG. 7B is a schematic diagram illustrating the case where edges have been extracted from all the edge extraction regions. As illustrated in FIG. 7B, edges 1210, 1220, 1230, and 1240 corresponding to the through holes WHs are extracted by applying an edge extraction filter to the areas of the edge extraction regions 1110, 1120, 1130, and 1140 illustrated in FIG. 7A.

If the edges 1210 to 1240 have been extracted from all of the edge extraction regions 1110 to 1140 (S105: YES), the CPU 240 performs fitting of a circle to an edge set 1200 containing the edges 1210 to 1240 (circle fitting). The CPU 240 measures a position of the workpiece W by the arithmetic operation of the circle fitting (S106).

Figure 7C:
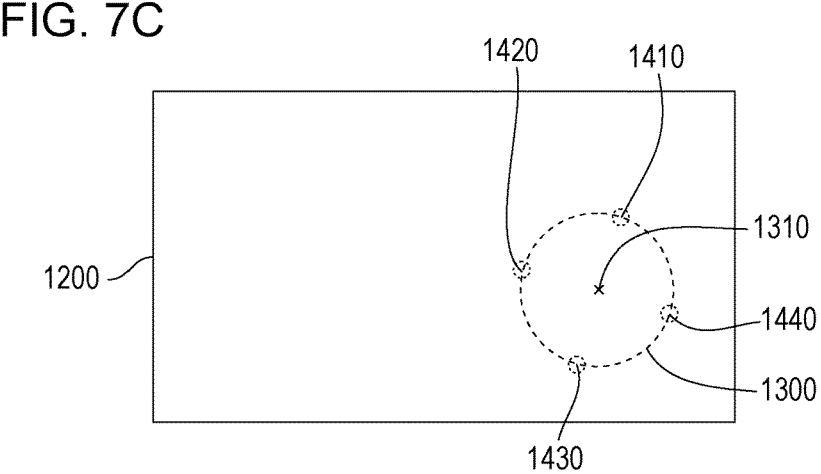
FIG. 7C is a schematic diagram illustrating a fitting operation.

FIG. 7C is a schematic diagram illustrating a fitting operation. The operation of step S106 will be specifically described below. First, the CPU 240 calculates center points 1410, 1420, 1430, and 1440 of the edges 1210, 1220, 1230, and 1240. Assuming the through holes WHs are circular in shape, the edges 1210 to 1240 are circular in shape, and thus fitting of a circle to each of the edges 1210 to 1240 is performed to calculate the center points 1410, 1420, 1430, and 1440. Then, the CPU 240 further performs fitting of a circle to four center points 1410, 1420, 1430, and 1440 to calculate an approximate circle 1300 and a center point 1310 of the approximate circle 1300 illustrated in FIG. 7C. A position of the calculated center point 1310 is the position of the workpiece W.

If there is an edge that has not been able to be extracted in step S104 (S105: NO), the CPU 240 complements the edge with an edge contained in the model 800 (S107). That is, the CPU 240 uses a model edge contained in the model 800 used in the rough search in place of an edge in a portion where extraction has failed.

Figure 8A:
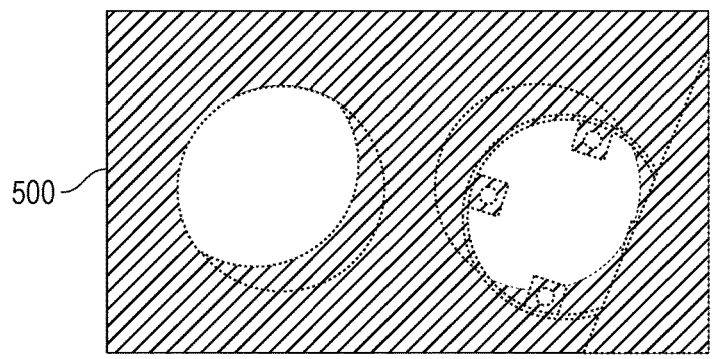
FIGS. 8A and 8B are schematic diagrams each illustrating a situation in which an edge cannot be extracted in the search image.
Figure 8B:
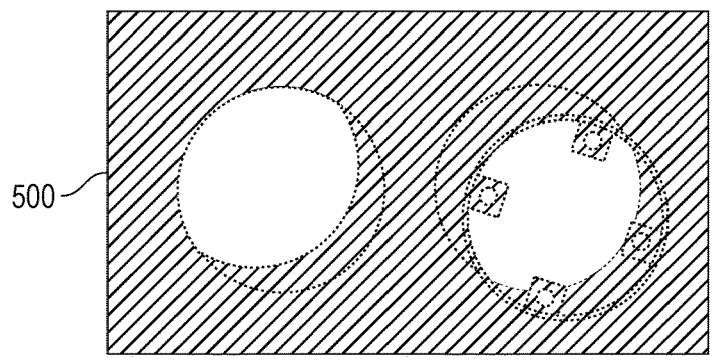

FIGS. 8A and 8B are schematic diagrams each illustrating a situation in which an edge cannot be extracted in the search image. Examples of a situation in which an edge cannot be extracted in the search image 500 include a situation in which occlusion occurs as illustrated in FIG. 8A and a situation in which an edge intensity of each through hole WH decreases because light from the light source 102 is low in intensity as illustrated in FIG. 8B.

As illustrated in FIGS. 8A and 8B, when there is an edge extraction region where no edge corresponding to some through hole WH among the four through holes WHs has been able to be extracted, if fitting of a circle to only extracted edges is performed, the accuracy of measurement of a position of the workpiece W decreases.

Thus, in the first embodiment, to keep the accuracy of measurement of a position of the workpiece W from decreasing, the edge 1240 corresponding to a missing through hole WH is complemented with the model edge 840 of the model 800, and then circle fitting is performed.

That is, if there is an edge extraction region where no edge has been able to be extracted in step S104, the CPU 240 obtains, of the model 800 moved to the position searched for in step S103, a model edge located in the edge extraction region where no edge has been able to be extracted. Then, the CPU 240 incorporates the obtained model edge into the edge set 1200 and performs fitting of a circle to the edge set 1200 complemented with the model edge.

Figure 9:
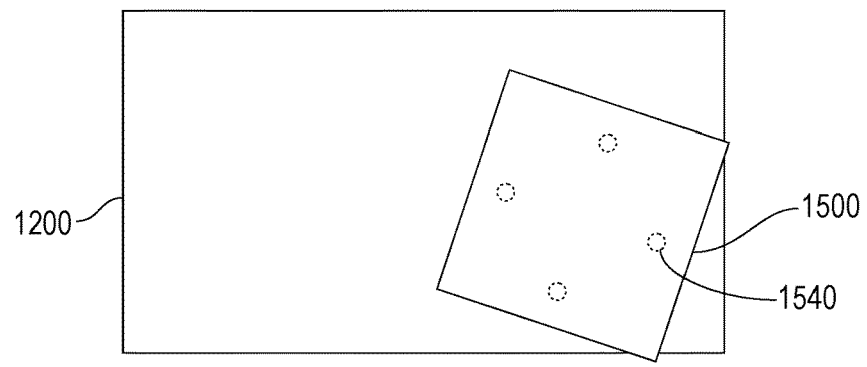
FIG. 9 is a schematic diagram illustrating an example of an affine transformation of a model edge set.

FIG. 9 is a schematic diagram illustrating an example of an affine transformation of the model edge set. Specific description will be given below. First, the CPU 240 calculates an affine transformation matrix for moving the model edge set 800 to a workpiece position on the search edge set 900 on the basis of the rough search result in S103. Coordinates of all edge points constituting the model edge set 800 are subjected to an affine transformation by using the calculated affine transformation matrix, and a model edge set 1500 that has been subjected to the affine transformation is generated as illustrated in FIG. 9. Then, as a replacement of the edge 1240, an edge 1540 (corresponding to the model edge 840) that has been subjected to the affine transformation serves at the position of the missing through hole WH. That is, the CPU 240 incorporates the edge 1540 as an edge extracted in the edge extraction region 1140 into the edge set 1200 used in circle fitting. Thus, in the subsequent step S106, the CPU 240 performs circle fitting by using the edge set 1200 constituted by the edges 1210, 1220, 1230, and 1540.

As described above, as for the model 800 moved to the position searched for in step S103, the CPU 240 incorporates the model edge 840 located in the edge extraction region 1140 where edge extraction has failed into the edge set 1200. Then, the CPU 240 performs fitting to the edge set 1200 complemented with the model edge 840.

According to the first embodiment, the incorporation of the model edge 840 (edge 1540) corresponding to the edge 1240 whose extraction has failed into the edge set 1200 enables a position of the workpiece W to be measured with high accuracy even if the number of edges extracted from the search image 500 is reduced.

Note that, in the second and later rounds (measurements of positions of the second and later workpieces) of the process of the flowchart illustrated in FIG. 3, the model 800 acquired in step S102 in the first round is used, and thus the operation of step S102 can be omitted.

Second Embodiment

Figure 10:
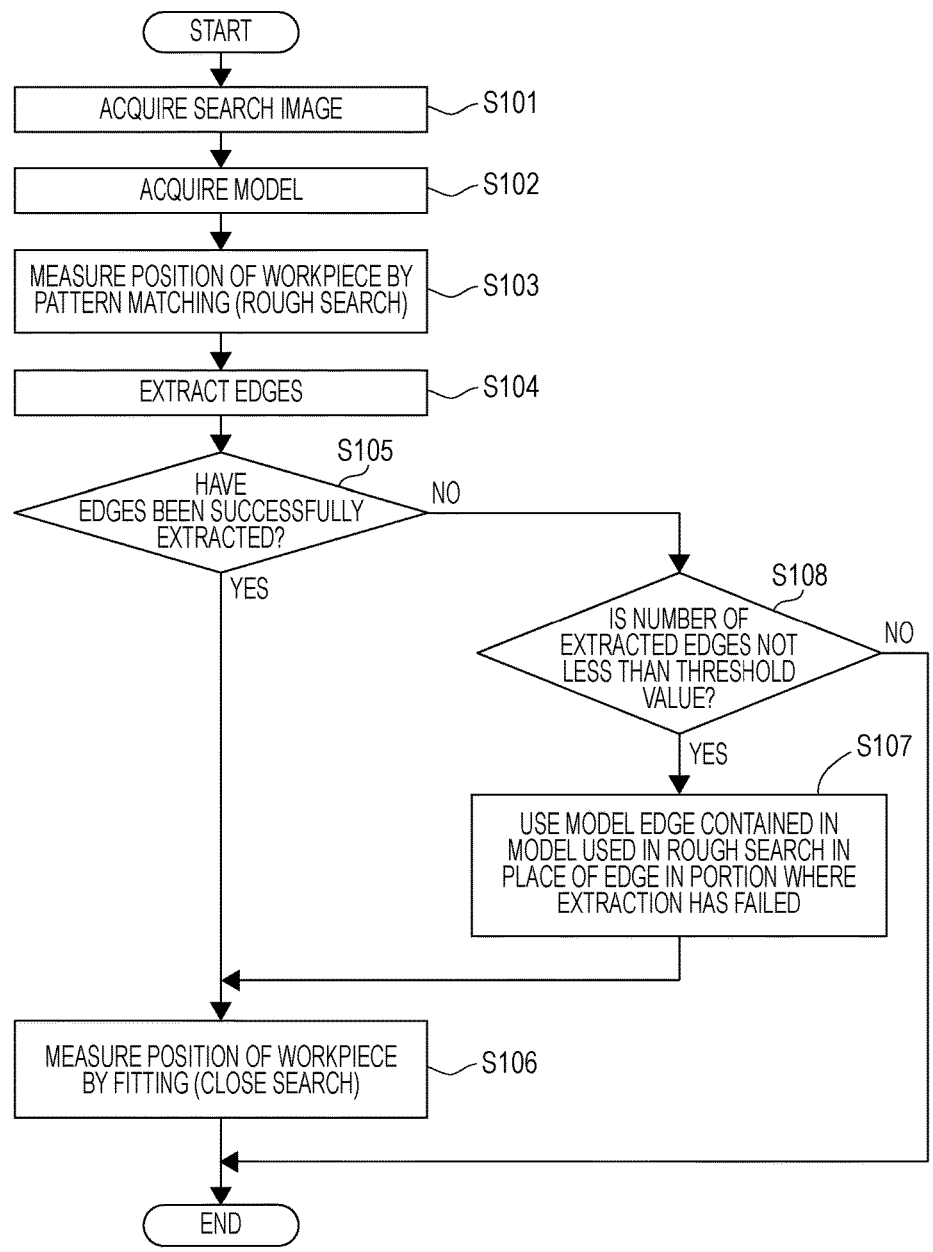
FIG. 10 is a flowchart illustrating an image processing method according to a second embodiment.

Next, an image processing method according to a second embodiment of the present invention will be described. FIG. 10 is a flowchart illustrating an image processing method according to the second embodiment of the present invention. In the second embodiment, the configuration of the image processing apparatus is the same as that in the first embodiment, and a process performed by the CPU 240, that is, the program 290 is different from that in the first embodiment. Specifically, in the second embodiment, as illustrated in FIG. 10, an operation (determination operation, determination step) of step S108 is further added to the flowchart of the image processing method illustrated in FIG. 3 in the first embodiment.

Steps S101 to S105 are the operations described in the first embodiment. In step S105, if the CPU 240 determines that there is an edge extraction region where no edge has been able to be extracted in step S104 (S105: NO), the CPU 240 makes a threshold determination as to the number of edges extracted in step S104 (S108). Specifically, in step S108, the CPU 240 determines whether the number of extracted edges is not less than a threshold value, that is, whether the operation of step S106 is to be performed. If the CPU 240 determines that the number of extracted edges is not less than the threshold value, that is, that the operation of step S106 is to be performed (S108: YES), the CPU 240 performs the operation of step S107. If the CPU 240 determines that the number of extracted edges is less than the threshold value, that is, that the operation of step S106 is not to be performed (S108: NO), the CPU 240 ends the process without performing the operation of step S107.

Thus, in step S105, if the CPU 240 determines that edges have been able to be extracted in all the edge extraction regions, the CPU 240 performs fitting of a circle (a certain shape) to the edge set 1200 constituted by a plurality of extracted edges (S106). In step S105, if the CPU 240 determines that there is an edge extraction region where no edge has been able to be extracted, the CPU 240 makes a threshold determination as to the number of extracted edges to determine whether the operation of step S106 (close search operation) is to be performed (S108). If the CPU 240 determines that the close search operation is to be performed, the CPU 240 moves the model 800 to the position searched for in S103. In this state, the CPU 240 incorporates a model edge located in the edge extraction region where edge extraction has failed into the edge set 1200 and performs fitting to the edge set 1200.

Thus, in the second embodiment, the number of edge replacements is restricted because an increase in the number of edge replacements causes the accuracy of measurement of a position to be the same as that in the rough search. A threshold value may be set to a value corresponding to the necessary accuracy of measurement of a position.

In a threshold determination in step S108, a determination may be made as to whether the number of edges that have not been able to be extracted in S104 is not greater than a certain threshold value. If the number is not greater than the threshold value, the CPU 240 may proceed to S107 to perform an edge complement operation. If the number is greater than the threshold value, the CPU 240 may regard measurement of a position as having failed to end the process without performing an edge complement operation. For example, among four through holes, if the number of through holes whose edges have not been able to be extracted is up to one, an edge complement operation may be performed.

As described above, according to the second embodiment, it is determined in accordance with a threshold value whether a close search operation is to be performed. If the number of extracted edges is excessively small, measurement of a position is regarded as having failed and the process is ended, thereby making it possible to keep a less-accurate measurement result from being calculated. Thus, the accuracy of a calculated position of the workpiece W can be secured.

The present invention is not limited to the above-described embodiments, and many modifications can be made within the technical idea of the present invention. The effects described in the embodiments of the present invention are merely the most exemplary effects produced by the present invention. The effects produced by the present invention are not limited to the effects described in the embodiments of the present invention.

The present invention can also be implemented by supplying a program that implements one or more functions in the above-described embodiments to a system or apparatus via a network or a storage medium, and by causing one or more processors of a computer in the system or apparatus to read and execute the program. The present invention can also be implemented by a circuit (an application specific integrated circuit (ASIC), for example) that implements one or more functions.

Although, in the above-described embodiments, the case where a through hole is used as a feature of the workpiece W is described, a feature is not limited to this, and any feature, such as a hollow, can be used.

In the above-described embodiments, although the example where circle fitting is applied in a close search is described, fitting is not limited to the circle fitting, and fitting of a certain shape corresponding to the arrangement of features of the workpiece W may be performed. For example, in the case where features of the workpiece W are arranged in an ellipse, ellipse fitting is applied to measure the center coordinates and rotation angle of the ellipse, and the measurement results may serve as a position of the workpiece W. In the case of the workpiece W having features arranged in a rectangle, rectangle fitting is applied to measure the center coordinates and rotation angle of the rectangle, and the measurement results may serve as a position of the workpiece W. In this way, fitting of a shape corresponding to the shape of an envelope connecting a plurality of features existing in a workpiece may be performed.

Figure 11:
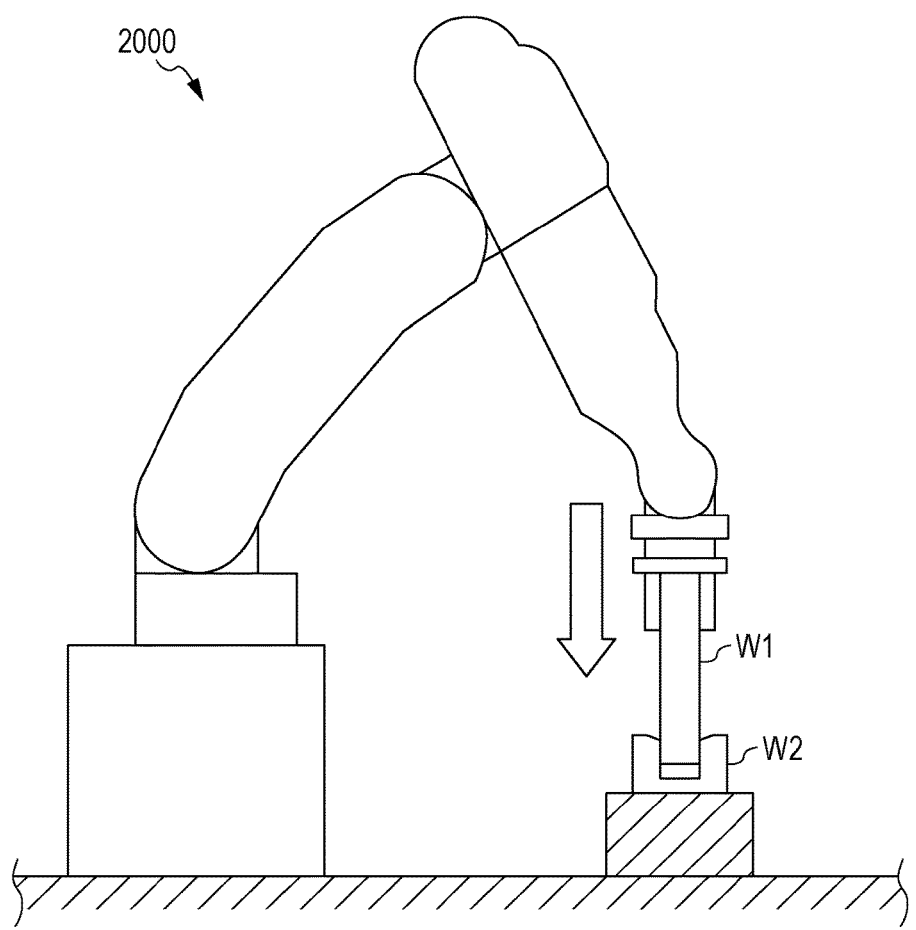
FIG. 11 is a schematic diagram illustrating an example of a method of manufacturing an assembly.

According to the present invention, a position of a workpiece can be determined with high accuracy. Thus, fine components can be assembled to each other accurately. For example, as illustrated in FIG. 11, highly accurate determination of a position of a second workpiece W2 according to the present invention enables highly accurate positioning of a first workpiece W1 held by a robot 2000 at the determined position of the second workpiece W2, and thus an assembly can be accurately manufactured.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-149328, filed Jul. 29, 2015, which is hereby incorporated by reference herein in its entirety.

What is claimed is:

1. An image processing method in which a processing unit determines, through image processing, a position of a workpiece from a search image obtained by capturing an image of the workpiece, the image processing method comprising:
   a model acquisition step of, with the processing unit, acquiring a model containing a plurality of model edges;
   a rough search step of, with the processing unit, within the search image, searching for a position where a degree of matching between the search image and the model is maximized;
   an edge extraction step of, with the processing unit, within the search image, setting an edge extraction region for each of the plurality of model edges contained in the model when the model is moved to the position searched for in the rough search step and performing an arithmetic operation of extracting an edge in each of the plurality of edge extraction regions; and
   a close search step of, with the processing unit, performing fitting of a certain shape to an edge set of edges extracted in the edge extraction step to calculate a position of the workpiece,
   wherein, in the close search step, if there is an edge extraction region where no edge has been able to be extracted in the edge extraction step, the processing unit incorporates, of the model moved to the position searched for in the rough search step, a model edge located in the edge extraction region where no edge has been able to be extracted in the edge extraction step into the edge set and performs the fitting.

2. The image processing method according to claim 1, wherein, in the close search step, if edges have been extracted from all of the plurality of edge extraction regions in the edge extraction step, the processing unit causes the edge set to be constituted by all the edges extracted in the edge extraction step.

3. The image processing method according to claim 1, further comprising
   a determination step of, with the processing unit, comparing a number of edges extracted in the edge extraction step with a threshold value, and, in a case where the number of edges extracted in the edge extraction step is less than the threshold value, determining that the close search step is to be performed.

4. The image processing method according to claim 1, wherein the certain shape is a circle, an ellipse, or a rectangle.

5. An image processing apparatus comprising
   a processing unit configured to determine, through image processing, a position of a workpiece from a search image obtained by capturing an image of the workpiece,
   the processing unit being configured to perform
      a model acquisition operation of acquiring a model containing a plurality of model edges,
      a rough search operation of, within the search image, searching for a position where a degree of matching between the search image and the model is maximized,
      an edge extraction operation of, within the search image, setting an edge extraction region for each of the plurality of model edges contained in the model when the model is moved to the position searched for in the rough search operation and performing an arithmetic operation of extracting an edge in each of the plurality of edge extraction regions, and
      a close search operation of performing fitting of a certain shape to an edge set of edges extracted in the edge extraction operation to calculate a position of the workpiece,
   wherein, in the close search operation, if there is an edge extraction region where no edge has been able to be extracted in the edge extraction operation, the processing unit incorporates, of the model moved to the position searched for in the rough search operation, a model edge located in the edge extraction region where no edge has been able to be extracted in the edge extraction operation into the edge set and performs the fitting.

6. The image processing apparatus according to claim 5, wherein, in the close search operation, if edges have been extracted from all of the plurality of edge extraction regions in the edge extraction operation, the processing unit causes the edge set to be constituted by all the edges extracted in the edge extraction operation.

7. The image processing apparatus according to claim 5, wherein the processing unit is configured to compare a number of edges extracted in the edge extraction step with a threshold value, and, in a case where the number of edges extracted in the edge extraction step is less than the threshold value, perform the close search step.

8. The image processing apparatus according to claim 5, wherein the certain shape is a circle, an ellipse, or a rectangle.

9. A non-transitory computer-readable recording medium recording a program that causes a computer to execute each step of the image processing method according to claim 1.

10. A method of manufacturing an assembly, in which a processing unit determines, through image processing, a position of a workpiece from a search image obtained by capturing an image of the workpiece, the method comprising:
    a model acquisition step of, with the processing unit, acquiring a model containing a plurality of model edges;
    a rough search step of, with the processing unit, within the search image, searching for a position where a degree of matching between the search image and the model is maximized;
    an edge extraction step of, with the processing unit, within the search image, setting an edge extraction region for each of the plurality of model edges contained in the model when the model is moved to the position searched for in the rough search step and performing an arithmetic operation of extracting an edge in each of the plurality of edge extraction regions;
    a close search step of, with the processing unit, performing fitting of a certain shape to an edge set of edges extracted in the edge extraction step to calculate a position of the workpiece,
    wherein, in the close search step, if there is an edge extraction region where no edge has been able to be extracted in the edge extraction step, the processing unit incorporates, of the model moved to the position searched for in the rough search step, a model edge located in the edge extraction region where no edge has been able to be extracted in the edge extraction step into the edge set and performs the fitting, and
assembling a second component to a first component with the position of the workpiece.

\* \* \* \* \*